US009128886B2

(12) United States Patent
Kusterer et al.

(10) Patent No.: US 9,128,886 B2
(45) Date of Patent: Sep. 8, 2015

(54) COMPUTER IMPLEMENTED METHOD, COMPUTER SYSTEM, ELECTRONIC INTERFACE, MOBILE COMPUTING DEVICE AND COMPUTER READABLE MEDIUM

(75) Inventors: Stefan Kusterer, Nussloch (DE); Ralf Handl, Heidelberg (DE); Kalyani G., Bangalore (IN); Reiner P Hammerich, Rauenberg (DE); Martin Zurmuehl, Muehlhausen (DE); Hendrik C. R. Lock, Linkenheim (DE)

(73) Assignee: SAP SE, Walldorf (DE)

( * ) Notice: Subject to any disclaimer, the term of this patent is extended or adjusted under 35 U.S.C. 154(b) by 497 days.

(21) Appl. No.: 13/331,824

(22) Filed: Dec. 20, 2011

(65) Prior Publication Data

US 2013/0159468 A1 Jun. 20, 2013

(51) Int. Cl.
G06F 15/16 (2006.01)
G06F 9/00 (2006.01)
H04W 4/18 (2009.01)
H04L 29/08 (2006.01)

(52) U.S. Cl.
CPC ........ G06F 15/16 (2013.01); G06F 9/00 (2013.01); H04L 67/2823 (2013.01); H04L 67/2895 (2013.01); H04W 4/18 (2013.01); H04L 67/02 (2013.01)

(58) Field of Classification Search
CPC ............. H04L 12/2836; H04L 29/06068; H04L 29/06047; H04L 29/0899; H04L 67/2823; H04L 67/2895; H04L 67/02; H04W 4/18; G06F 9/00; G06F 15/16
USPC .......................................... 709/217, 219, 230
See application file for complete search history.

(56) References Cited

U.S. PATENT DOCUMENTS

| 6,594,685 | B1 * | 7/2003 | Mishra et al. ............. 709/203 |
| 7,296,052 | B2 | 11/2007 | Heymann et al. |
| 7,308,676 | B2 | 12/2007 | Kusterer et al. |
| 7,340,679 | B2 | 3/2008 | Botscheck et al. |
| 7,340,718 | B2 | 3/2008 | Szladovics et al. |
| 7,421,437 | B2 | 9/2008 | Hoeft et al. |
| 7,441,239 | B2 | 10/2008 | Bittner et al. |
| 7,461,382 | B2 | 12/2008 | Hammerich et al. |
| 7,469,255 | B2 | 12/2008 | Kusterer et al. |
| 7,562,347 | B2 | 7/2009 | Baumgart et al. |
| 7,584,457 | B2 | 9/2009 | Hammerich et al. |
| 7,606,820 | B2 | 10/2009 | Stienhans et al. |
| 7,689,567 | B2 | 3/2010 | Lock et al. |
| 7,757,208 | B2 | 7/2010 | Degenkolb et al. |
| 7,761,474 | B2 | 7/2010 | Lock et al. |

(Continued)

Primary Examiner — Jonathan Bui
(74) Attorney, Agent, or Firm — Fish & Richardson P.C.

(57) ABSTRACT

The present disclosure describes computer implemented methods, computer systems, electronic interfaces, mobile computing devices, and computer readable mediums for processing a request from a mobile application residing on a mobile computing device. One method may include receiving the request for data from the mobile application residing on the mobile device at an interface. The method may further include determining an interface service to be executed and executing the interface service. The method can then obtain, at the interface, from the execution of the interface service, a consumption model comprising one or more data models and associated data. The method may further include translating the consumption model and the associated data into an open source protocol, and sending a response from the interface including the translated consumption model and the associated data to the mobile application on the mobile device.

13 Claims, 4 Drawing Sheets

(56) References Cited

U.S. PATENT DOCUMENTS

| | | |
|---|---|---|
| 7,770,103 B2 | 8/2010 | Hammerich et al. |
| 7,784,022 B2 | 8/2010 | Elfner et al. |
| 7,788,644 B2 | 8/2010 | Koduru et al. |
| 7,797,370 B2 | 9/2010 | Brunswig et al. |
| 7,962,470 B2 | 6/2011 | Degenkolb et al. |
| 7,992,128 B2 | 8/2011 | Hammerich et al. |
| 8,073,434 B2 | 12/2011 | Lock et al. |
| 8,117,529 B2 | 2/2012 | Melamed et al. |
| 8,214,737 B2 | 7/2012 | Botscheck et al. |
| 8,266,104 B2 | 9/2012 | Lock et al. |
| 8,271,882 B2 | 9/2012 | Botscheck et al. |
| 8,429,549 B2 | 4/2013 | Zurmuehl et al. |
| 8,509,751 B2 | 8/2013 | Lock et al. |
| 8,510,682 B2 | 8/2013 | Kusterer et al. |
| 8,595,095 B2 | 11/2013 | Borchardt et al. |
| 8,694,912 B2 | 4/2014 | Zurmuehl |
| 8,712,953 B2 | 4/2014 | Beringer et al. |
| 8,713,368 B2 | 4/2014 | Lock |
| 8,756,338 B1 * | 6/2014 | Potakamuri ............ 709/238 |
| 8,782,530 B2 | 7/2014 | Beringer et al. |
| 8,856,365 B2 | 10/2014 | Zurmuehl et al. |
| 8,862,613 B2 | 10/2014 | Stein et al. |
| 2002/0049749 A1 * | 4/2002 | Helgeson et al. ............ 707/3 |
| 2003/0154401 A1 * | 8/2003 | Hartman et al. ............ 713/201 |
| 2003/0191799 A1 * | 10/2003 | Araujo et al. ............ 709/203 |
| 2010/0057744 A1 * | 3/2010 | Lock et al. ............ 707/10 |
| 2010/0146576 A1 * | 6/2010 | Costanzo et al. ............ 725/117 |
| 2010/0299407 A1 * | 11/2010 | Casey et al. ............ 709/219 |
| 2011/0196914 A1 * | 8/2011 | Tribbett ............ 709/203 |
| 2011/0246971 A1 * | 10/2011 | Chua et al. ............ 717/135 |
| 2012/0246190 A1 * | 9/2012 | Surtani et al. ............ 707/769 |
| 2013/0159530 A1 * | 6/2013 | James et al. ............ 709/226 |

* cited by examiner

COMPUTER IMPLEMENTED METHOD, COMPUTER SYSTEM, ELECTRONIC INTERFACE, MOBILE COMPUTING DEVICE AND COMPUTER READABLE MEDIUM

TECHNICAL FIELD

This application relates to a computer implemented method, a computer system, an electronic interface, a mobile computing device and a computer readable medium.

BACKGROUND

For business users, it is important to have real-time access to data from business applications since business users are expected to handle critical tasks and decision making for a company, no matter where they are located. However, data from a business application is generally accessible at the location of a business application terminal i.e. at the premises of the company, or via a computer having a secure connection to a server hosting the business application. Thus, to access such data, the business user may physically go to the premises of the company to use the business application terminal having access to the business application, or the business user may remotely connect to the server hosting the business application by setting up a secure connection with a computer. There is a lack of flexibility that business users face when attempting to gain access to data from business applications from locations where it is not feasible to set up a secure connection with a computer or to physically go to the business application terminal located at the premises of the company.

SUMMARY

The present disclosure describes computer implemented methods, computer systems, electronic interfaces, mobile computing devices, and computer readable mediums for processing a request from a mobile application residing on a mobile computing device. One method may include receiving the request for data from the mobile application residing on the mobile device at an interface. The method may further include determining an interface service to be executed and executing the interface service. The method can then obtain, at the interface, from the execution of the interface service, a consumption model comprising one or more data models and associated data. The method may further include translating the consumption model and the associated data into an open source protocol, and sending a response from the interface including the translated consumption model and the associated data to the mobile application on the mobile device.

While generally described as computer implemented software embodied on non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

BRIEF DESCRIPTION OF THE DRAWINGS

Details of one or more implementations are set forth in the accompanying exemplary drawings and exemplary description below. Other features will be apparent from the description and drawings, and from the claims.

DETAILED DESCRIPTION

In the following, a detailed description of embodiments will be given with reference to the drawings. It should be understood that various modifications to the embodiments may be made. In particular, one or more elements of one or more embodiments may isolated from each other and may be combined and/or used in other embodiments to form new embodiments.

Figure 1:
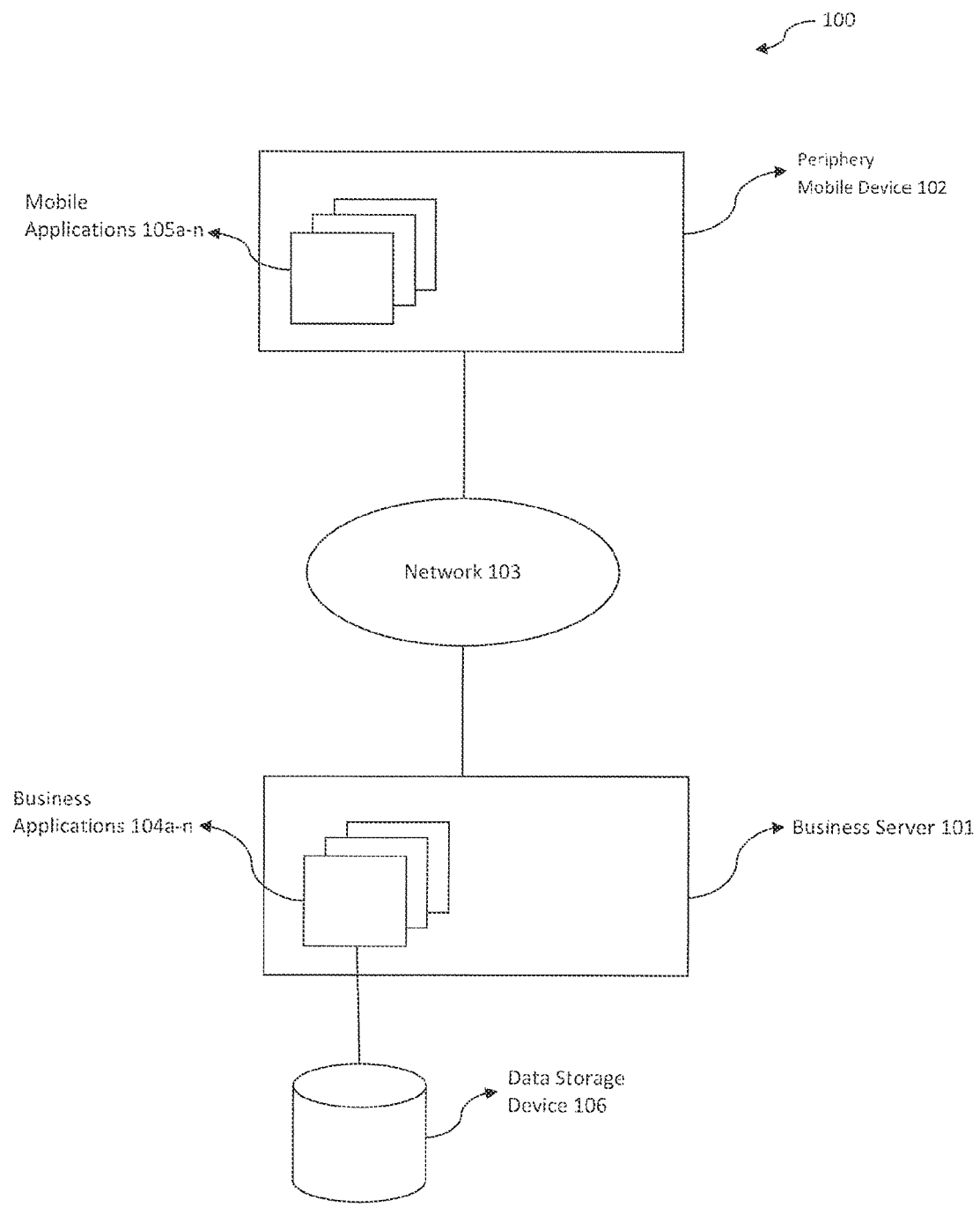
FIG. 1 shows an exemplary system architecture diagram, according to an embodiment.

FIG. 1 shows an exemplary system architecture diagram 100 of communications between a business application server 101 at the premises of a business entity (not shown) and a periphery mobile device 102 via a network 103, according to an embodiment. According to an embodiment, mobile applications 105a-n residing on the periphery mobile device 102 may access business data and/or functionality of one or more business applications 104a-n residing on the business application server 101. The business applications 104a-n may be coupled to a data storage device 106.

The business application server 101 may host a variety of applications. For example, the business application server 101 may host legacy systems, data warehouses, and/or connecting software applications, etc. Further, the business application server 101 may host one or more proprietary business applications 104a-n in dedicated business areas such as enterprise resource planning (ERP), supply chain management (SCM), finance, travel management, etc. In one embodiment, the business application server 101 hosts an SAP Business Suite application, from SAP in Walldorf, Germany.

The data storage device 106 may be used to store business data associated with one or more of the business applications 104a-n. For example, the data storage device 106 may store bank data associated with a bank business application. The data storage device 106 may be located on the business application server 101, or may be located external to the business application server 101 as shown in FIG. 1. The data storage device 106 may comprise a relational database, a cube, a cloud, etc.

The periphery mobile device 102 may be a smartphone, a tablet computer, a personal digital assistant (PDA), etc. The periphery mobile device 102 may include the one or more mobile applications 105a-n. The mobile applications 105a-n may be pre-installed on the periphery mobile device 102 or may be downloaded onto the periphery mobile device 102 via the network 103. The periphery mobile device 102 may specifically be a mobile computing device. For simplicity, in this application the term mobile device may also refer to a mobile computing device or a periphery mobile device.

Each of the mobile applications 105a-n may serve as client software for each of the business applications 104a-n, respectively. For example, mobile application 105a may provide a user of the periphery mobile device 102 with access to the business data and/or functionality of business application 104a. The mobile applications 105a-n are easy to use, and may integrate with the native application on the respective periphery mobile device 102 and have a look and feel native to the periphery mobile device 102. Alternatively, the mobile application 105a-n may use a web browser of the mobile device for rendering the user interface. Advantageously, end users, such as the owner of periphery mobile device 102, may be informed of issues pertaining to the business applications 104a-n via the corresponding mobile applications 105a-n.

The mobile applications 105a-n may request data and/or functionality from a corresponding business application 104a-n. The mobile applications 105a-n may also receive data and/or functionality based on a push notification. A push notification includes an event occurring in the business application 104a, resulting in data being pushed to the mobile application 105a without a request having been made by the mobile application 105a. Mobile application 105a may make a request of and receive responses from business application 104a using an open source protocol. The open source protocol may be a web protocol for querying and updating data that is synchronous and Representational State Transfer (REST)-based.

For example, the open source protocol may be Open Data Protocol (OData). OData is a set of REST-based interactions, i.e. HTTP interactions, and includes at least the create/read/update/delete (CRUD) HTTP operations. The HTTP operations may be encoded in an OData-defined query language. The HTTP operations may also be encoded as Activity Streams or Server-Sent-Events. The open source protocol may also be XMPP encoded as Atom.

Additionally or as an alternative to using HTTP(S) as an underlying protocol, OData could use a proprietary protocol called IMO. IMO may use TCP/IP as transport layer protocol. IMO may be used specifically for the communication between middleware (201) to the mobile device (102) via the relay server (207). Also in such an implementation, the payload is defined according to the OData standard.

Figure 2:
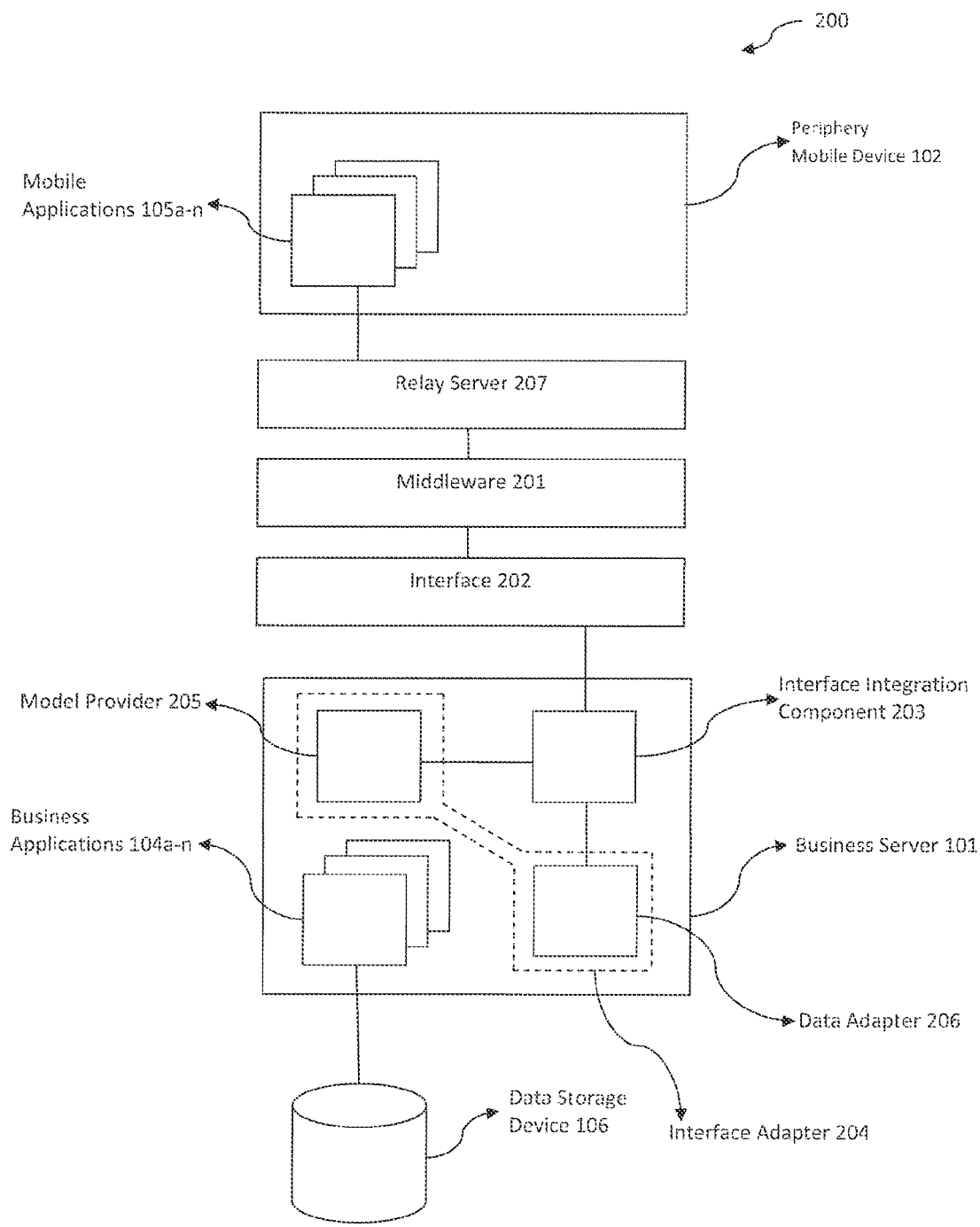
FIG. 2 shows a more detailed view of the exemplary system architecture diagram of FIG. 1, according to an embodiment.

FIG. 2 shows a more detailed view 200 of the exemplary system architecture diagram 100 of FIG. 1, illustrating the components involved in communications between business applications 104a-n residing on the business application server 101 and the respective mobile applications 105a-n residing on the periphery mobile device 102, according to an embodiment. Involved in the communications between the business applications 104a-n and the mobile applications 105a-n are: middleware 201, relay server 207, an interface 202, an interface integration component 203 and an interface adapter 204. In this application, the term interface adapter 204 may also be referred to as integration adapter 204. The interface adapter 204 may comprise a model provider 205 and a data adapter 206. The interface 202 may specifically be an electronic interface. For simplicity, in this application the term interface may also refer to an electronic interface. As an alternative, in this application the term gateway or electronic gateway may be used instead of the term interface. Further, both the middleware 201 and/or the relay server 207 may be omitted from an embodiment.

The mobile applications 105a-n and the middleware 201 may communicate with each other. The middleware 201 resides between the mobile applications 105a-n and the interface 202. The middleware 201 may provide the periphery mobile device 102 with access to the interface 202 across a firewall of the business entity (not shown). The middleware 201 may also provide additional functionality such as on-boarding, authentication, API (application programming interface) management, message routing and push notifications. The latter may include the communication with additional infrastructure e.g. provided by the vendor of the operating system, which is deployed on the mobile device (102). This may allow push notification including communication with specific/dedicated servers. In one embodiment, mobile application 105a may send a request to the middleware 201, such as an HTTP request. In another embodiment, the middleware 201 may send a response to the mobile application 105a, such as an HTTP response. Alternatively, the relay server 207 may reside between the mobile applications 105a-n and the middleware 201. In this alternative embodiment, the mobile applications 105a-n and the relay server 207 may communicate with each other and the relay server 207 and the middleware 201 may communicate with each other. The relay server 207 may provide functionality of a reverse proxy, providing the mobile applications 105a-n with connectivity to the middleware 201.

The middleware 201 and the interface 202 may communicate with each other. The interface 202 may be located on the same premises as the business application server 101, i.e. the premises of the business entity, in a different computing device than the business application server 101. In another embodiment, the interface 202 may be located on the premises of a third party. In another embodiment, the interface 202 may be a cloud comprising functions, not residing in a physical location but still separate from the business applications server 101. Further, in one embodiment, the middleware 201 may forward a request from a requesting mobile application 105a to the interface 202, such as an HTTP request. In another embodiment, the middleware 201 may forward a response from the interface 202 to the mobile application 105a, such as an HTTP response. Alternatively, the middleware 201 may be omitted from an embodiment. In this alternative embodiment, the mobile applications 105a-n may communicate with the interface 202 and the interface 202 may communicate with the mobile applications 105a-n.

In the described approach, the middleware 201 may address security requirements and needs related to application management. The middleware 201 may allow IT teams defining which applications can be used by which user or more specifically, which requests coming from a specific application and user will be passed on the interface 202.

For push notification, the middleware 201 may provide an abstraction of the different APIs provided by the platform vendors. The middleware 201 thus may allow an application developer to ignore the technical differences of these mechanisms. The middleware may also provide information about how applications are used, such as e.g. frequency of requests, distribution of requests with respect to exposed interfaces etc. The middleware may also provide information about how long transfer of data takes between the business server and the mobile device. This is also of interest for IT teams.

It is possible that the middleware 201 is not used for integrating interfaces exposed by different system into one interface that then can be directly consumed by the mobile application.

The interface 202 may allow other applications, i.e. the mobile applications 105a-n, to interact with proprietary business applications, i.e. the business applications 104a-n residing on the business application server 101, by exposing specified data of one or more business applications 104a-n to a requesting mobile application 105a as an interface service. The interface 202 stores a registry of predefined interface services available on the business application server 101 for execution (not shown). When the interface 202 executes an interface service, the interface service enables the proprietary business applications 104a-n to communicate with external programs, such as the mobile applications 105a-n by causing the retrieval of the specified data from the data storage device 106 associated with the proprietary business applications 104a-n in a RESTful manner. In one embodiment, the interface 202 is an OData Channel from SAP AG in Walldorf, Germany.

Upon the arrival of an incoming request for data and/or functionality from one of the mobile applications 105a-n, such as mobile application 105a, the interface 202 determines, from the request, which interface service is to be executed from the one or more interface services stored in an interface registry of the interface 202. For example, the interface 202 may determine which interface service is to be executed from the one or more interface services stored in the interface registry of the interface 202 based on the OData-encoded HTTP request from the mobile application 105a. The interface 202 then executes the determined interface service via a remote function call (RFC) to the interface integration component 203 residing on the business application server 101. To do so, the interface 202 translates the request to a RFC. Generally, a RFC is a dedicated call between computing components. For example, in an embodiment, the RFC is a call to the business application server 101, and particularly to the interface integration component 203 from the interface 202.

The interface 202 and the interface integration component 203 may communicate via the RFC. The interface integration component 203 may be located on the business application server 101. The interface integration component 203 is a software module that enables the business application server 101 to communicate with interface 202 and may provide functionality to expose the data and/or functionality as REST-based services. In one embodiment, the interface integration component 203 may be an IW_BEP software component from SAP AG in Walldorf, Germany and may enable communication with the OData Channel from SAP AG in Walldorf, Germany.

OData Channel as used in this application may describe the usage pattern of Gateway. In addition to the OData Channel, Gateway may support the so-called Generic Channel, in which application-specific metadata is stored on Gateway. When used via the Generic Channel, Gateway allows developers to adopt existing back-end APIs without providing additional code on the back-end. However, since existing back-end APIs usually do not exactly fit the specific requirements of new mobile applications, the Generic Channel approach may result in significant overhead, such as e.g. additional calls between Gateway and the back-end, unnecessary data that is transferred between the back-end and Gateway etc. Advantageously, OData Channel does e.g. not result in such an overhead.

Moreover, the OData Channel may comprise all the functionality that is needed to handle a code-based exposure of back-end functionality via OData. In this, one important functionality lies in the translation of the generic calls to the application code on the back-end, i.e. the model provider, data adapter, into OData services (protocol translation). In addition, based on the OData Channel functionality, Gateway may detect which back-end component needs to be called, based on the incoming request. Since several back-end systems may be connected to Gateway and in each of these systems, several model providers/data adapters may reside, this selection process may determine (1) the correct back-end system and (2) the required model provider/data adapter combination in the specific back-end system. This detection may be done using configuration data that is stored on Gateway. It links information sent as part of the request to the respective system and back-end API (i.e. model provider/data adapter combination).

In an example, for executing a service, OData Channel first detects which system/back-end API needs to be called. Based on the request, OData Channel can also detect if the model provider or the data adapter needs to be called. OData Channel then calls the interface integration component 203 in the respective system, which then calls the addressed back-end application code (i.e. specific model provider or data adapter). The result of this is passed back to Gateway/OData Channel via the generic RFC interface that the Gateway main component may use for the communication with interface integration component 203. Then, Gateway translates this into OData.

For push notification, Gateway exposes an API as part of the OData Channel, which allows back-end code to send notifications via Gateway, the middleware and the vender specific infrastructure to the respective application on the mobile device An exemplary communication sequence may be:
Back-end code communicates with
Gateway Odata Channel which communicates with
middleware which communicates with
vendor specific infrastructure which communicates with
OS on the mobile device which communicates with
application on the mobile device.

The data sent via RFC may allow the interface integration component 203, e.g. the IW_BEP module to (1) call the correct application component, such as model provider and/or data adapter and (2) return the results to Gateway. The RFCs between IW_BEP and Gateway may be generic and not adapted in any way to the specific application. The interface integration component 203 may expose ABAP interfaces, similar to Java interfaces, for which the respective application component provides implementing classes. However, also these interfaces need not be application specific. Rather, only their implementation may be application specific. The RFC-based data exchange between the interface integration component 203 and Gateway/OData Channel covers metadata (i.e. details of the model) and content data, depending on the request sent to Gateway. For instance, if the client request calls for a service document, this may result in transfer of model information (i.e. metadata). If for example a query-request is sent, this may lead to content data being transferred between the interface integration component 203 and Gateway via the same RFC interfaces.

The interface integration component 203 and the integration adapter 204 may communicate with each other. The integration adapter 204 resides on the business application server 101 and may comprise the model provider 205 and the data adapter 206. The model provider 205 and the data adapter 206 may be connected to the interface integration component 203. Additionally, the data adapter 206 may be connected to the one or more business applications 104a-n residing on the business application server 101.

Based on communication from the interface integration component 203, the model provider 205 may provide one or more predefined data model(s) associated with the RFC of the interface service being executed. A predefined data model describes data stored in the data storage device 106 with metadata and includes operations that may be performed on the data. The data adapter 206 may provide data from the data storage device 106, according to the one or more predefined data models provided by the model provider. For example, the data adapter 206 may query the data storage device 106 associated with the business application 104a for data according to the metadata described by the predefined data model. For example, the data may include customers' names, addresses, and contact details for a Sales Manager.

The predefined data model generated by the model provider 205 and the associated data generated by the data adapter 206 may be provided from the interface adapter 204 to the interface integration component 203. The interface integration component 203 may generate a consumption model and expose the consumption model to the interface 202. A consumption model may be a bundle of the one or more data models associated with the interface service being executed.

The consumption model and the data generated by the data adapter 206 may be exposed by the interface integration component 203 to the interface 202 via a RFC. A RFC is a dedicated call to the interface 202, and particularly to the interface integration component 203. For example, in an embodiment, the RFC is a call to the interface 202 from the business application server 101, and particularly from the interface integration component 203.

The interface 202 may receive the consumption model via the RFC and translate the consumption model to the open source protocol. For example, the received consumption model may be translated to an OData protocol. The interface 202 may send a response to the request from the mobile application 105*a* by including the translated consumption model and the specified data in a response to the requesting mobile application 105*a*. For example, the translated consumption model and the specified data may be encoded in OData XML and sent back to the requesting mobile application 105*a* via an HTTP response.

Advantageously, the interface 202 does not include any artifacts of the business applications 104*a-n* residing on the business application server 101. Therefore, synchronization between the interface 202 and the business applications 104*a-n* residing on the business application server 101 does not need to be maintained. Moreover, the user of the mobile application 105*a-n* may only see the translated consumption model provided by the interface 202, but not the underlying data model from the proprietary business applications 104*a-n*. Thus, consuming data does not impose any requirement on the application developer or user to be able to write software in the proprietary language, or even to have any understanding of the internal workings of the proprietary business applications 104*a-n* itself.

Further advantageously, the interface 202, among others due to its communication abilities with the interface adapter 204 and/or the interface integration component 203 allows that the mobile application 105*a-n* may stay slim and simple. In particular, this may allow that the mobile application 105*a-n* does not need to contain any of the logic provided by the proprietary business applications 104*a-n*. In addition, data exchange between the mobile application 105*a-n* and the proprietary business applications 104*a-n* can be reduced, thus network traffic may be kept low, since it may be possible to exchange simple requests and simple results, only.

Summarizing, a computer system may be adapted and operable for processing a request from a mobile application residing on a mobile device. The system may comprise an interface and a business application server. The interface may be operable to receive the request for data from the mobile application residing on the mobile device. The interface may be operable to determine an interface service to be executed. The interface may be operable to execute the interface service. The interface may be operable to obtain a consumption model comprising one or more data models and associated data. The interface may be operable to translate the consumption model to an open source protocol. The interface may be operable to send a response including the translated consumption model to the mobile application on the mobile device.

The business application server may comprise a model provider operable to determine the one or more data models associated with the interface application. The business application server may comprise a data adapter operable to determine the data associated with the one or more data models. The business application server may comprise an interface integration component operable to generate the consumption model comprising the one or more data models and the associated data.

In other words, the system may be operable to carry out a method as described below in conjunction with FIG. 3.

Moreover, the interface may be referred to as an electronic interface. The electronic interface may be operable to receive the request for data from a mobile application residing on the mobile device. The electronic interface may be operable to determine an interface service to be executed. The electronic interface may be operable to execute the interface service. The electronic interface may be operable to translate the interface service into a request for a consumption model. The electronic interface may be operable to obtain a consumption model comprising one or more data models and associated data. The electronic interface may be operable to translate the consumption model to an open source protocol. The electronic interface may be operable to send a response including the translated consumption model to the mobile application on the mobile device. Optionally, the electronic interface may be operable to obtain the consumption model from a business application server, and wherein the electronic interface is separate from the business application server.

In other words, the interface 202 and the integration component 203 as shown in FIG. 2 may be separate to such an extent and/or at least partially independent from each other to such an extent that this architecture allows that the interface 202 does not include any artifacts of the business applications 104*a-n* residing on the business application server 101.

Moreover, a mobile computing device may be provided that allows communication with the system described above. More specifically a mobile computing device may be provided that allows, in conjunction with the system described above, to carry out the method described below with respect to FIG. 3. The mobile computing device may comprise a mobile application. The mobile application may perform the steps of sending a request for data from the mobile application encoded in an open source protocol to a proprietary business application. The mobile application may perform the steps of obtaining from the business application a consumption model comprising one or more data models and associated data encoded in an open source protocol.

Figure 3:
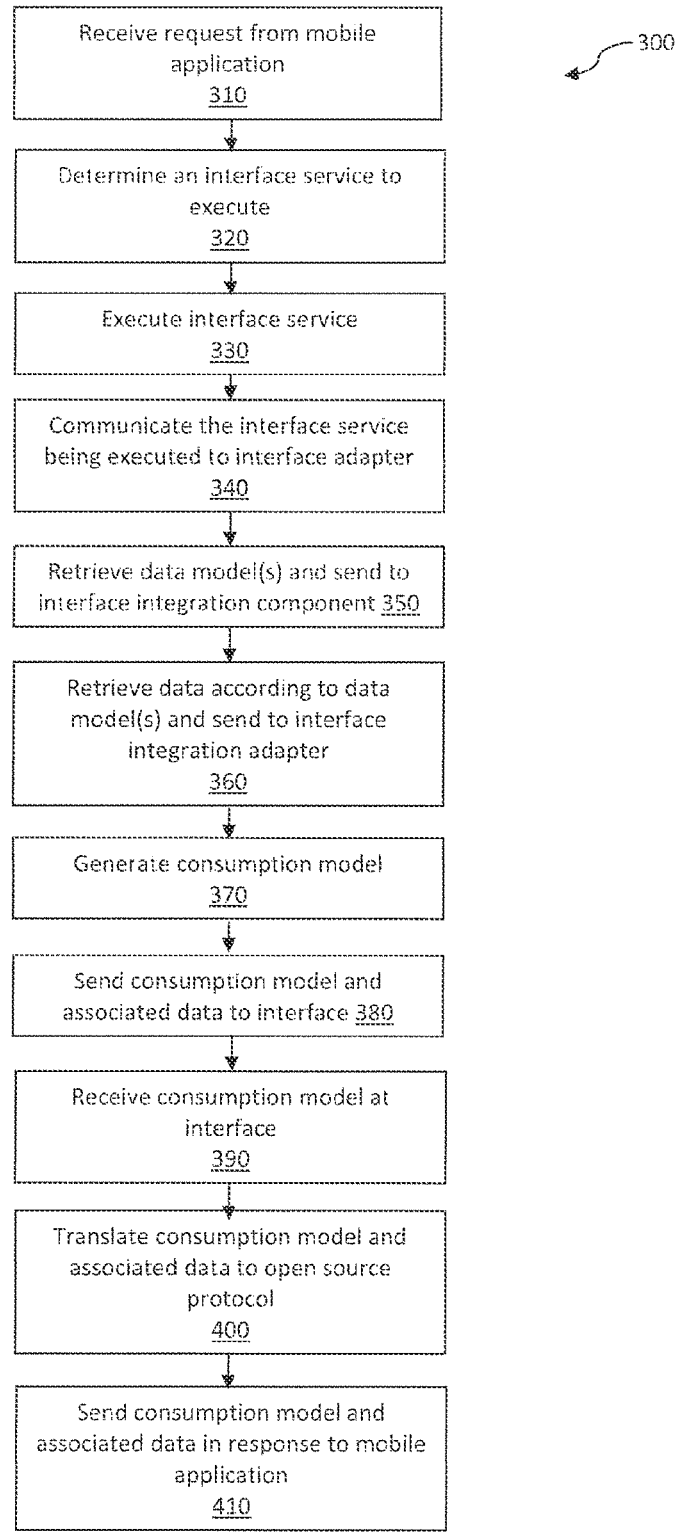
FIG. 3 shows an exemplary method, according to an embodiment.

FIG. 3 shows an exemplary method 300, according to an embodiment. The method 300 illustrates the steps involved in responding to a request from a mobile application residing on a periphery mobile device for data and/or functionality from a corresponding business application residing on a business application server, according to an embodiment.

At step 310, an interface receives a request from a mobile application residing on a periphery mobile device for data and/or functionality from a proprietary business application residing on a business application server. The request from the mobile application may be an HTTP request. While using HTTP allows obtaining the above mentioned technical effects and advantages, depending on the technical details of the given implementation the request may also be another type of request. The HTTP request may be encoded in an OData-defined query language. While using an OData-defined query language allows obtaining the above mentioned technical effects and advantages, depending on the technical details of the given implementation the request may also be encoded in another (query) language.

At step 320, the interface determines, from the request, which interface service is to be executed from one or more interface services stored in an interface registry on the interface. An interface service enables a proprietary business application residing on a business application server to communicate with an external program, such as the mobile application, by exposing specified data of the business application to the requesting mobile application.

At step 330, the interface executes the determined interface service via a remote function call (RFC) to an interface integration component residing on the business application server. The interface service execution may involve the interface translating the request from an open source protocol to a RFC. The interface integration component may be a software module that enables the business application server to communicate with the interface and may provide functionality to expose the requested data and/or functionality as REST-based services.

At step 340, the interface integration component communicates to an interface adapter the interface service that is being executed. The interface adapter may comprise a model provider and a model adapter. The model provider and the data adapter may be connected to the interface integration component. Additionally, the data adapter may be connected to the one or more business applications residing on the business server.

At step 350, the model provider of the interface adapter retrieves and provides to the interface integration component one or more predefined data model(s) associated with the RFC of the interface service being executed. The predefined data model describes data stored in the data storage device with metadata and includes operations that may be performed on the data.

At step 360, the data adapter of the interface adapter provides the specified data according to the predefined data model provided by the model provider. For example, the data adapter may query a data storage device associated with the business application for data according to the metadata described by the predefined data model.

At step 370, the interface integration component, after receiving the predefined data models and the specified data, may generate a consumption model. A consumption model may be a bundle of one or more data models, associated with the interface service.

At step 380, the interface integration component sends the consumption model and the specified data to the interface via a RFC. In other words, the method comprises obtaining, at the interface, from the execution of the interface service, a consumption model comprising one or more data models and associated data. Further, while using a RFC allows obtaining the above mentioned technical effects and advantages, depending on the technical details of the given implementation the communication may also be implemented using different technical means.

At step 390, the interface receives the consumption model via the RFC.

At step 400, the interface translates the consumption model to the open source protocol. For example, the interface may translate the consumption model to OData XML or—depending on the technical implementation—in another suitable language.

At step 410, the interface sends a response to the request from the mobile application by sending the translated consumption model and the specified data in a response to the requesting mobile application. For example, the translated consumption model may be encoded in OData XML or—depending on the technical implementation—in another suitable language, and sent back to the requesting mobile application via an HTTP response. Alternatively, another protocol may be used.

In view of the above described method, a computer readable medium may be provided. The computer readable medium may be operable for processing a request from a mobile device. The computer readable medium may comprise computer executable instructions that, when executed, perform the steps of:

receiving the request for data from a mobile application residing on the mobile device;
determining an interface service to be executed;
executing the interface service;
obtaining from the execution of the interface service, a consumption model comprising one or more data models and associated data;
translating the consumption model and the associated data into an open source protocol; and
sending a response including the translated consumption model and the associated data to the mobile application on the mobile device.

Figure 4:
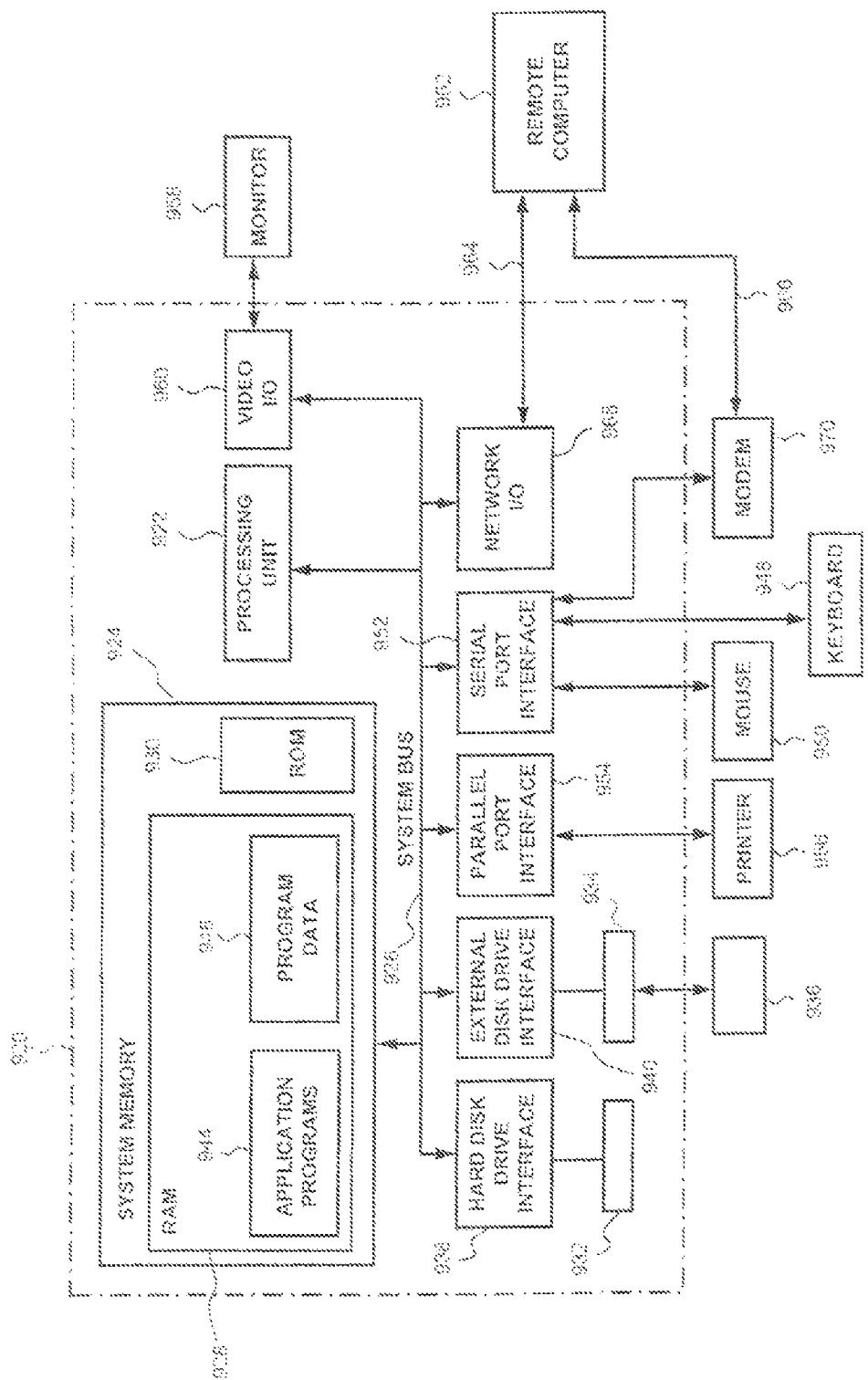
FIG. 4 shows an exemplary computer system and/or computer network system for implementing a computer system and a method as shown in FIGS. 1 to 3, according to an embodiment.

FIG. 4 shows an exemplary system for implementing the method including a general purpose computing device in the form of a conventional computing environment 920 (e.g. a server). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the server 920, such as during start-up, may be stored in the ROM 930. The system bus 926 may be any of several types of bus structures including a memory bus or memory controller, a peripheral bus, and a local bus using any of a variety of bus architectures.

The server 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the server 920. The data structures may include relevant data for the implementation of the method, as described above. The relevant data may be organized in a database, for example a relational database management system or a object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 3.

A user may enter commands and information, as discussed below, into the server 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956 and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 2 depicts the computer environment networked with remote computer 962, i.e. mobile device 102. The remote computer 962 may be another computing environment such as a mobile device such as a smart phone or tablet, and may include many of the elements described above relative to the computing environment 920. The logical connections depicted in FIG. 8 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method may be resident on or accessible via the remote computer 962. It will be appreciated that the network connections shown are exemplary and other means of establishing a communications link between the electronic devices may be used.

The above-described computing system is only one example of the type of computing system that may be used to in the method described above.

What is claimed is:

1. A computer implemented method for processing a request from a mobile application residing on a mobile computing device, comprising:

receiving, at an interface, the request for data from the mobile application residing on the mobile computing device, wherein the request for data does not specify a particular back-end system;

determining, at the interface, an interface service to be executed using configuration data linking the request for data with a back-end application programming interface (API), wherein determining the interface service to be executed includes:

identifying one of a plurality of back-end systems associated with the received request for data; and identifying at least one API of the identified back-end system, wherein identifying at least one API includes identifying a model provider and a data adapter, wherein the model provider is configured to determine one or more data models associated with the determined interface service, and the data adapter is configured to determine data associated with the one or more data models;

executing, at the interface, the determined interface service associated with the at least one identified API;

obtaining, at the interface, from the execution of the determined interface service, a consumption model comprising the one or more data models and the associated data;

translating, at the interface, the consumption model and the associated data into an open source protocol; and sending, from the interface, a response including the translated consumption model and the associated data to the mobile application on the mobile device.

2. The method of claim 1, wherein the interface is an OData Channel and the open source protocol is an OData protocol.

3. The method of claim 1, wherein the translated consumption model is exposed in OData at the interface.

4. The method of claim 1, wherein the request received from the mobile device is an HTTP request indicating the interface service to be executed.

5. A computer system for processing a request from a mobile application residing on a mobile device, comprising:

an interface operable to:

receive the request for data from the mobile application residing on the mobile device, wherein the request for data does not specify a particular back-end system;

determine an interface service to be executed using configuration data linking the request for data with a back-end application programming interface (API), wherein determining the interface service to be executed includes:

identifying one of a plurality of back-end systems associated with the received request for data; and identifying at least one API of the identified back-end system, wherein identifying at least one API includes identifying a model provider and a data adapter, wherein the model provider is configured to determine one or more data models associated with the determined interface service, and the data adapter is configured to determine data associated with the one or more data models;

execute the determined interface service associated with the at least one identified API;

obtain a consumption model comprising the one or more data models and the associated data;

translate the consumption model and the associated data into an open source protocol; and send a response including the translated consumption model and the associated data to the mobile application on the mobile device;

a business application server, comprising:

the model provider;
the data adapter; and
an interface integration component operable to generate the consumption model.

6. The system of claim 5, wherein the interface is an OData Channel and the open source protocol is an OData protocol.

7. The system of claim 5, wherein the translated consumption model is exposed in OData at the interface.

8. The system of claim 5, wherein the request received from the mobile device is an HTTP request indicating the interface service to be executed.

9. The system of claim 5, wherein the interface and the business application server communicate via remote function calls.

10. The system of claim 5, wherein the interface executes the interface service via a remote function call.

11. The system of claim 5, wherein the business application server sends the consumption model to the interface via a remote function call.

12. A non-transitory computer readable medium for processing a request from a mobile application residing on a mobile device, comprising computer executable instructions that, when executed, perform the steps of:
   receiving the request for data from the mobile application residing on the mobile device, wherein the request for data does not specify a particular back-end system;
   determining an interface service to be executed using configuration data linking the request for data with a back-end API, wherein determining the interface service to be executed includes:
      identifying one of a plurality of back-end systems associated with the request for data; and
      identifying at least one API at the identified back-end system, wherein identifying at least one API includes identifying a model provider and a data adapter, wherein the model provider is configured to determine one or more data models associated with the determined interface service, and the data adapter is configured to determine data associated with the one or more data models;
   executing the identified interface service associated with the at least one identified API;
   obtaining from the execution of the interface service, a consumption model comprising the one or more data models and the associated data;
   translating the consumption model and the associated data into an open source protocol; and
   sending a response including the translated consumption model and the associated data to the mobile application on the mobile device.

13. The method of claim 1, wherein the identified at least one API is an existing generic API.

* * * * *